(12) United States Patent
Ahn et al.

(10) Patent No.: US 8,482,592 B2
(45) Date of Patent: Jul. 9, 2013

(54) DISPLAY APPARATUS AND CONTROL METHOD THEREOF

(75) Inventors: Young-ho Ahn, Suwon-si (KR); Han-wook Cho, Suwon-si (KR); Kyoung-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1564 days.

(21) Appl. No.: 11/839,627

(22) Filed: Aug. 16, 2007

(65) Prior Publication Data
US 2008/0180517 A1   Jul. 31, 2008

(30) Foreign Application Priority Data
Jan. 30, 2007   (KR) .................. 10-2007-0009656

(51) Int. Cl.
   *H04N 7/14*   (2006.01)
(52) U.S. Cl.
   USPC .................. 348/14.01; 348/14.12; 348/14.14
(58) Field of Classification Search
   USPC .......... 348/14.01, 14.02, 14.05, 14.09, 14.08, 348/14.1, 14.12–14.14; 455/418–420, 3.03, 455/414.1, 556.1, 557
   See application file for complete search history.

(56) References Cited

U.S. PATENT DOCUMENTS

| | | | |
|---|---|---|---|
| 6,034,715 A | | 3/2000 | Ishida et al. |
| 6,570,606 B1 * | | 5/2003 | Sidhu et al. .................. 348/14.1 |
| 7,221,385 B2 | | 5/2007 | Hamada |
| 7,515,173 B2 * | | 4/2009 | Zhang et al. ............... 348/14.16 |
| 2003/0067534 A1 | | 4/2003 | Ejima et al. |
| 2004/0088356 A1 * | | 5/2004 | Sellen et al. ................... 709/205 |
| 2004/0227810 A1 | | 11/2004 | Hamada |
| 2005/0128284 A1 * | | 6/2005 | Hoffer et al. ................ 348/14.02 |
| 2005/0157170 A1 * | | 7/2005 | Morishima .................... 348/161 |
| 2006/0082676 A1 | | 4/2006 | Jenkins et al. |
| 2007/0002130 A1 | | 1/2007 | Hartkop |
| 2007/0139515 A1 * | | 6/2007 | Du Breuil .................. 348/14.01 |
| 2008/0088698 A1 * | | 4/2008 | Patel et al. .................. 348/14.09 |
| 2009/0219379 A1 * | | 9/2009 | Rossato et al. ............. 348/14.01 |

FOREIGN PATENT DOCUMENTS

| | | |
|---|---|---|
| CN | 2456415 Y | 10/2001 |
| EP | 1 420 588 A2 | 5/2004 |
| EP | 1465424 A2 | 10/2004 |
| JP | 200432305 A | 1/2004 |
| JP | 2004289688 A | 10/2004 |
| JP | 2004-357118 A | 12/2004 |
| JP | 2005-110157 A | 4/2005 |
| KR | 20010058556 A | 7/2001 |
| KR | 1020040042362 A | 5/2004 |

OTHER PUBLICATIONS

Communication issued Oct. 18, 2010 by State Intellectual Property Office of P.R. China in counterpart Chinese Application No. 200710192807.X.
Communication dated Feb. 28, 2013 from the Korean Intellectual Property Office in counterpart Korean application No. 10-2007-0009656.

* cited by examiner

*Primary Examiner* — Brandon Miller
(74) *Attorney, Agent, or Firm* — Sughrue Mion, PLLC

(57) ABSTRACT

A display device which performs a video telephony is provided. The display device includes a photographing unit which photographs an image, a video telephony unit which performs a video telephony using an image photographed by the photographing unit, and a control unit which controls at least one of an operation of the photographing unit and an operation of the video telephony unit if a status of the photographed image meets a preset condition. Accordingly, power efficiency of a display device may be improved.

14 Claims, 5 Drawing Sheets

DISPLAY APPARATUS AND CONTROL METHOD THEREOF

CROSS-REFERENCE TO RELATED APPLICATIONS

This application claims priority from Korean Patent Application No. 10-2007-0009656, filed Jan. 30, 2007, in the Korean Intellectual Property Office, the entire disclosure of which is hereby incorporated by reference.

BACKGROUND OF THE INVENTION

1. Field of the Invention

Apparatuses and methods consistent with the present invention relate to a display device and method for controlling thereof, and more particularly, to a display device which performs video telephony and method for controlling thereof.

2. Description of the Related Art

Communication environments are changing rapidly such that they do not discriminate with regard to hardware (wired vs. wireless) or geography (regional vs. local). Particularly, the future communication environment representative of a mobile system such as IMT-2000 is tending towards being built as an environment which provides video and audio, along with various information required by a user in real time or synthetically. Further, due to the advancement of a personal communication system (PCS), cellular phones or PCSs are being developed which may transmit short message information, connect with an internet wirelessly using the personal communication terminal or transmit/receive moving images which can be watched only on TV, in addition to simple voice communication.

Particularly, when transmitting moving images in a digital television system, technology is necessary for transforming the moving image into digital data to transmit it in real time, and for receiving the digital data to display it. A personal digital assistant for processing the moving image transmitted in real time using IMT-2000, is also needed. The personal digital assistant can conventionally transmit/receive only human voice, while it can now transmit and receive a variety of information such as audio and video due to multimedia development and advancement of digital information processing technology. Such advancement of communication technology and moving image compressing technology enables transmission and reception of audio and video by a user in the video telephony of multi-media environment.

The term "video telephony" means a technology used for providing video conference or video telephone service between persons separated from each other, by transferring the video along with the audio via a communication network. The video communication may be a video communication using PC camera, or video communication using video chatting and a video phone, as well as a video communication/video telephony using the mobile communication terminal.

Meanwhile, in a case of performing video telephony using a display system which is capable of performing video telephony, image photographing proceeds irrespective of a status of the photographed image. That is, a useless image such as an excessively bright or dark image, or an image which is stopped for a long time, is continuously photographed.

Also, in a case of not performing the video telephony, that is, in a case of performing operation using another function of a display device, there are problems that power is supplied to a camera module such that power efficiency of a display device deteriorates.

SUMMARY OF THE INVENTION

Additional aspects of the present invention will be set forth in part in the description which follows and, in part, will be obvious from the description, or may be learned by practice of the present invention.

The present invention has been provided to address the above-mentioned and other problems and disadvantages occurring in the conventional arrangement, and an aspect of the present invention provides a display device and method for controlling thereof to improve power efficiency of the display device by controlling whether a video telephony is performed, and whether an image is photographed according to a status of the image.

According to an exemplary embodiment of the present invention, a display device may comprise a video telephony unit which comprises a photographing unit, and performs a video telephony using an image which is photographed through the photographing unit; and a control unit which controls at least one operation of the photographing unit and the video telephony unit if a status of the photographed image meets a preset condition.

The video telephony unit may comprise a power supply unit which supplies power to the photographing unit; a data input unit which receives data for communication; and a data transceiver unit which transmits a video telephony data including the photographed image and data for communication to the external device, and receives the video telephony data generated by the external device.

If the status of the photographed image meets the preset condition, the control unit may control the data transceiver unit such that the video telephony data is not transmitted.

If the status of the photographed image meets the preset condition, the control unit may disconnect power supply to the photographing unit.

The preset condition may be that a luminance of the photographed image is equal to or greater than a preset first critical luminance, or equal to or less than a preset second critical luminance.

The preset condition may be that the photographed image has been still for a reference time.

The display device may further comprise an input unit which receives a command for a video telephony, wherein the video telephony unit is activated and performs operation for a video telephony when the command for a video telephony is input, or data for a video telephony is received through the data transceiver unit.

The control unit may disconnect power supply to the photographing unit while the video telephony unit is in inactivate state.

The display device may further comprise a display; and a display processor which selectively provides one of result data of the video telephony performed at the video telephony unit and data received from an external device to the display.

A method for controlling a display device which performs a video telephony may comprise (a) photographing an image, and performing a video telephony using the photographed image, (b) determining whether a state of the photographed image meets the preset condition, and (c) stopping photographing operation if the preset condition is met.

The step of (a) may comprise supplying power to a photographing unit which photographs an image, photographing an image, and receiving data for communication and transmitting data for a video telephony including the photographed image and the input data for telephony to an external device, and receiving the data for a video telephony generated at the external device.

The step of (c) may cause the data for video telephony not to be transmitted, if a status of the photographed image meets the preset condition.

The step of (c) may disconnect power supplied to the photographing unit, if a status of the photographed image meets the preset condition.

The preset condition may be that a luminance of the photographed image is equal to or greater than a preset first critical luminance, or equal to or less than a preset second critical luminance.

The preset condition may be that the photographed image has been still for a reference time.

The method for controlling a display device may further comprise an input unit which receives a command for a video telephony, wherein the step of (a) performs operation for a video telephony, when the command for a video telephony is input, or data for a video telephony is received.

The step of (c) may disconnect power supply to the photographing unit while the video telephony unit is in inactivate state.

The method for controlling a display device may further comprise selectively displaying one of result data of the video telephony according to the video telephony and data received from an external device.

BRIEF DESCRIPTION OF THE DRAWINGS

The above and other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Certain exemplary embodiments of the present invention will be described in greater detail with reference to the accompanying drawings.

Figure 1:
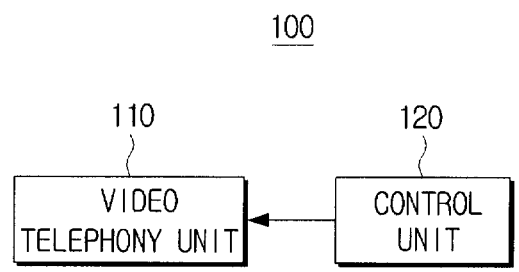
FIG. 1 is a block diagram illustrating a display device according to an exemplary embodiment of the present invention.

FIG. 1 is a block diagram illustrating a display device 100 according to an exemplary embodiment of the present invention. Referring to FIG. 1, the display device comprises a video telephony unit 110, and a control unit 120.

The display device 100 may possibly be implemented as a video telephony device, and the video telephony device transmits and receives a voice and an image for video telephony, using a network such as local area network (LAN), wide area network (WAN), and metropolitan area network (MAN) which are classified according to communication range.

The display device 100 may provide a selective video telephony with a plurality of parties. That is, if a user in video telephony receives a message of another incoming call, the user may put the current party to a holding state, and communicate with the second party. The video and voice of the second communication may not be transmitted to a display device of the party on hold.

The user may simultaneously perform video telephony with a plurality of parties, and host the video telephony with the plurality of parties by selecting or removing certain parties from a list of the parties displayed on a display.

Figure 2A:
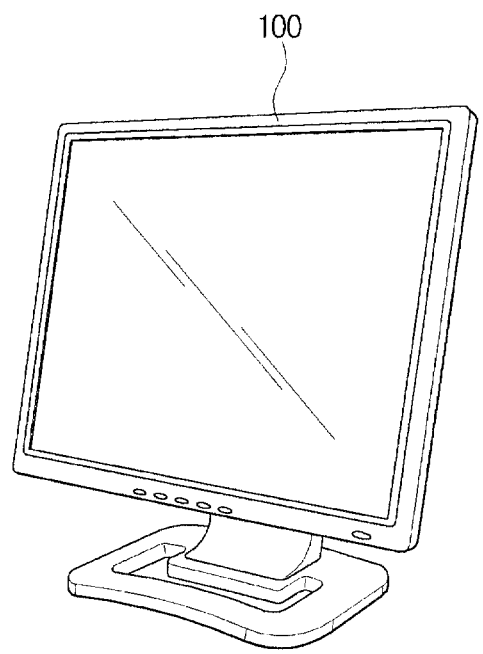
FIGS. 2A and 2B are schematic diagrams of the display device of FIG. 1.
Figure 2B:
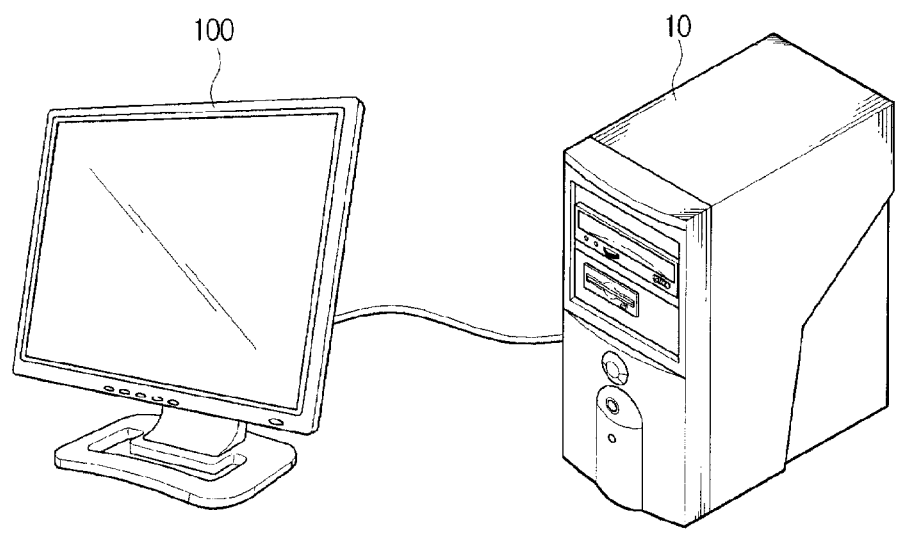

FIGS. 2A and 2B are schematic diagrams of the display device of FIG. 1.

Referring to FIG. 2A, the display device 100 may be implemented as a video telephony device which has a function of personal computer (PC) therein, and referring to FIG. 2B, the display device 100 may be operated as a monitor when is connected with the PC.

When only the display device 100 is embodied in FIG. 2A, an application operated by the control unit 120 inside the display device 100 may be displayed on a display.

When an external PC is connected with the display device 100 in FIG. 2B, an application input from the external PC may be displayed on a display. Since the above is an example form of the display device 100, various forms may be embodied as occasion demands.

The video telephony unit 110 performs image photographing and video telephony. That is, the video telephony unit 110 transmits and receives video telephony data, and processes a signal to display the video telephony data transmitted from another party's display device. Also, the video telephony unit 110 transmits a signal input through a camera (not shown) to the other party's display device.

The video image photographed through the camera is transmitted to a body of the display device 100, and the video image is transmitted to the external display device through a network interface unit (not shown). User display devices connected through a network may interchange information according to a communication protocol. That is, information including video information, voice information, and text information is interchanged. Generally, information is transmitted in a compressed file to improve a communication speed. An application for video telephony is programmed according to a communication protocol such that the video data may be separated from the data being transmitted to the network interface unit (not shown), and output through the display.

The camera converts the photographed video into an electric signal, and the converted signal is transmitted to a display device of another party through the network interface unit (not shown), and is displayed on a display of the other party. Also, the camera traces, detects, and enlarges only a face or only above the waistline of a user and transmits the edited video to the other party. By doing so, the user's privacy is protected. Accordingly, a function of tracing or detecting set by a user may not be applied.

The display device 100 may comprise a microphone array (not shown). The microphone array includes a plurality of microphones, and the respective microphones receive a voice signal of a user, and the received voice signal is analyzed, so that an approximate position of the user is confirmed.

The display device 100 may trace and detect only a face or above the waistline of a user who is in the position confirmed, by using the camera and microphone array (not shown), and also may remove voice signals input from different directions, and amplify only the voice signal input from a direction where the user is positioned.

If the status of the image photographed by the video telephony unit 110 meets a preset condition, the control unit 120 stops photographing for video telephony. Herein, the status of the photographed image includes not only the status of image which is being photographed by a camera, and but also the status of the camera which photographs an image, that is, whether the camera is in use. The condition to stop photographing includes not only a condition according to the status of image which is being photographed, but also a condition according to availability of the camera which photographs an image.

The control unit 120 can stop photographing according to various methods, including disconnecting power, controlling transmitting of the photographed image to an external device, and controlling whether or not to display video data generated at an external device.

Figure 3:
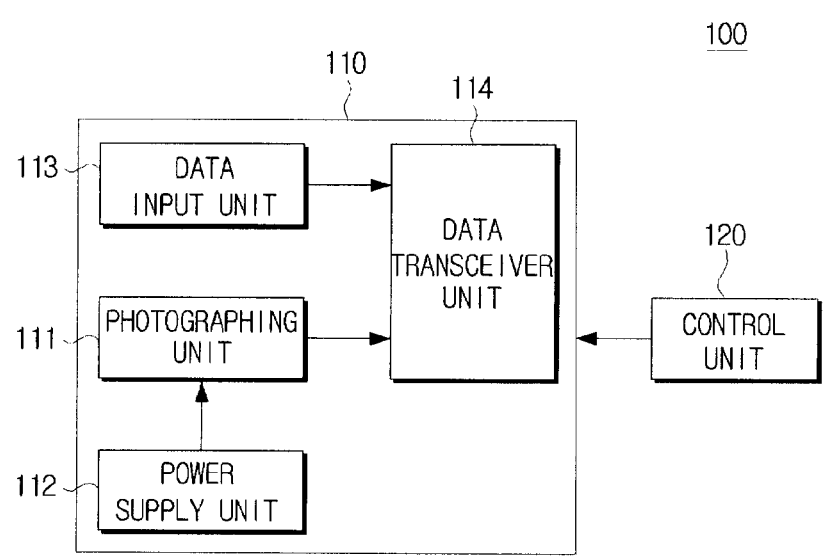
FIG. 3 is a detailed block diagram illustrating the display device of FIG. 1.

FIG. 3 is a detailed block diagram illustrating the display device 100 of FIG. 1. Referring to FIG. 3, the display device 100 comprises a video telephony unit 110, and a control unit 120. The video telephony unit 110 comprises a photographing unit 111, a power supply unit 112, a data input unit 113, and a data transceiver unit 114.

The photographing unit 111 photographs an image during video telephony. The photographing unit 111 may be implemented as a camera module which performs operations in relation to the photographing. A camera provided in the photographing unit 111 may be mounted to the display device 100 in advance, or may be implemented as a separate external camera connected to the display device 100 for use. Also, the camera may be a single camera having an integral viewfinder.

When camera selection, recording, capture, or other operations are required during video telephony, a desired function, such as video telephony, photographing, recording, or capture, is operated a by operating a control switch (not shown) using still photographing switch, a continuous photographing switch, a moving image photographing switch, and a voice recording switch mounted to a camera for video telephony.

The photographing unit 111 photographs a video according to the selected function such as still photographing, a still continuous photographing, or moving image photographing selected by manipulation of a user, and transmits the photographed information to the body of the display device 100 through the communication interface unit (not shown). In a case in which a camera is implemented as a single camera having an integral viewfinder, it is possible to display the photographed video directly on the viewfinder (not shown).

The power supply unit 112 supplies power to the photographing unit 111 and may also supply power to other units to operate the display device 100.

It is a merely exemplary embodiment that the power supply unit 112 is mounted in the video telephony unit 110, so the power supply unit 112 may be mounted on an external the video telephony unit 110 as occasion demands.

The control unit 120 controls the power supply unit 112 to disconnect power supplied to the photographing unit 111 if the status of the photographed image meets a preset condition. The control unit 120 controls whether to transmit the image to the external device, and whether to display the video data generated at the external device, according to the status of the photographed image.

Particularly, if a luminance of the image photographed by the photographing unit 111 is out of a valid range of the preset luminance, the control unit 120 determines that the image meets the preset condition, and stops photographing. Herein, the luminance is represented in the amount of light per unit area, and the stilb (a sign is sb), or the nit (a sign is nt) is used as a unit to represent the luminance. That is, if the luminance of the photographed image is equal to or greater than the preset first critical luminance, or equal to or less than the preset second critical luminance, it may be determined that the image meets the preset condition.

If a video signal input through a camera is separated into a color signal and a luminance signal by a color/luminance separating unit (not shown), and a luminance level of the separated signal is measured by the luminance measure unit (not shown), the control unit 120 can determine whether the measured luminance meets the preset condition. In this case, the standard range of the luminance may be preset, and the luminance range may be set based on the first critical luminance of an upper critical luminance, and the second critical luminance of a lower critical luminance. The critical luminance may be preset by a manufacturer of the display device 100, or a user may set or change the critical luminance as occasion demands. A method of determining the luminance was explained above, so a more detailed description is omitted.

If the image photographed by the photographing unit 111 has been still for a reference time, the control unit 120 determines that the image meets the preset condition, and stops the photographing unit 111 from photographing.

As an example of a method of determining whether the photographed image is still, the control unit 120 may calculate the sum of absolute difference (SAD) between every other field of the video signal input through the photographing unit 111. The control unit 120 calculates absolute variation between the calculated SADs, and then determines whether the input signal is still, on the basis of the SAD and the absolute variation. The method of determining the still image was explained above, so more description is omitted.

The data input unit 113 receives data for communication. The data input unit 113 may comprise an external input device such as a key panel, a keyboard, or a mouse included in a microphone receiving voice or a display device 100, and receive data for communication such as voice data, or text data.

The data transceiver unit 114 transmits video telephony data including the image photographed by the photographing unit 111 and data for communication input by the data input unit 113 to the external device, and receives the video telephony data generated by the external device. Herein, the configuration of the external device may be the same as the display device 100, and may be implemented as various devices such as a portable terminal device, and a PC which enables video telephony.

If the status of the photographed image meets the preset condition, the control unit 120 controls the data transceiver unit 114 such that the video telephony data is not transmitted.

Figure 4:
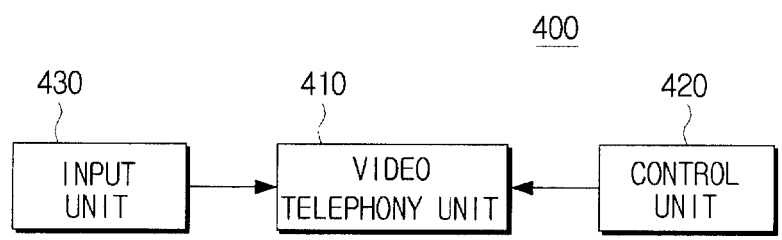
FIG. 4 is a block diagram illustrating a display device according to another exemplary of the present invention.

Referring to FIG. 4, the display device 400 comprises a video telephony unit 410, a control unit 420, and an input unit 430. The like elements illustrated in FIGS. 1 and 3 will not be explained in detail.

The input unit 430 receives a command for video telephony from a user. The input unit 430 may be implemented as a key panel which is mounted to a display device 400, a keyboard or a mouse which is connected to the display device 400 over wire or wirelessly, a remote control of an external input device, or a microphone which receives sound waves. The command for video telephony may include all commands by a user, including a menu selection, and a key input to perform video telephony on the display device 400.

The input unit 430 receives a selection signal to adjust a size of area, to display the area, or to hide the area in which a video is displayed.

The video telephony unit 410 is activated when the command for video telephony is input through the input unit 430, or video telephony data is received through the data transceiver unit 114, and performs operation for video telephony.

The control unit 420 may disconnect power supply to the photographing unit 111 while the video telephony unit 410 is in inactivate state. That is, the control unit 420 supplies power to the photographing unit 111, and performs operation for video telephony by supplying power, when a command for video telephony is input through the input unit 430, or the video telephony data is received through the data transceiver unit 114.

Figure 5:
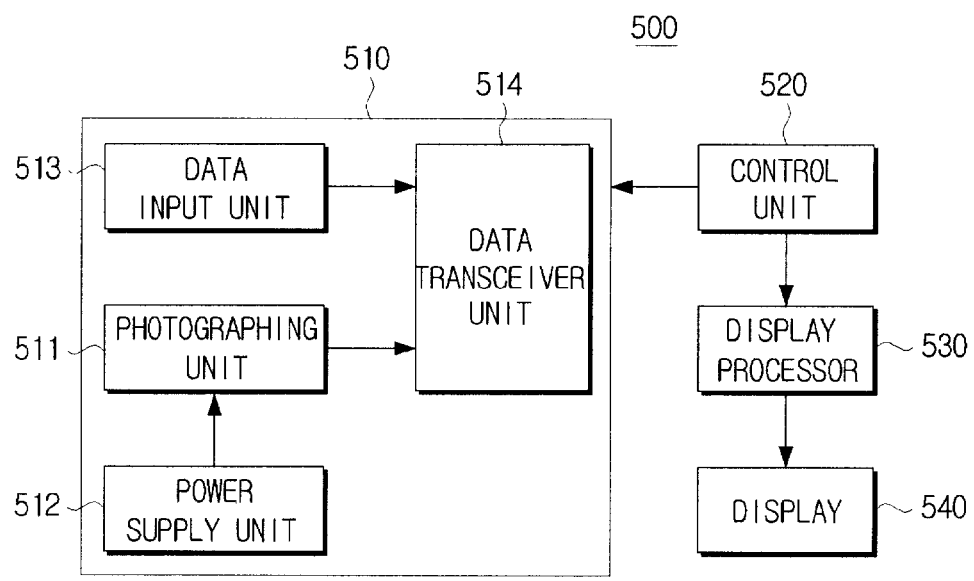
FIG. 5 is a block diagram illustrating a display device according to yet another exemplary embodiment of the present invention.

FIG. 5 is a block diagram illustrating a display device according to yet another exemplary embodiment of the present invention. Referring to FIG. 5, the display device 500 may comprise a video telephony unit 510, a control unit 520, a display processor 530, and a display 540. The like elements illustrated in FIGS. 1, 3, will not be explained in detail.

The display 540 displays a video for video telephony, and a screen which represents general operation of the display device 500. The 'screen' representing the general operations may be a window screen when using a PC function. The display 540 may be implemented as a plasma display panel (PDP), a liquid crystal display (LCD), or a cathode ray tube (CRT).

While a video according to general operation of a user is displayed, if the video telephony is started according to a user or another party, the display 540 may display the video of a video telephony in an overlapping manner on the current video. In this case, the video according to the video telephony may be displaying the other party, or a user himself.

The display processor 530 may, during the video telephony, cause video to appear at least on a part of the entire screen.

That is, while a video according to operations related to other function of the display device 500 is displayed, the display processor 530 may cause the video according to the video telephony to appear as a part of the screen. The size of area in which the video of video telephony is displayed on the screen may be preset by a user when video telephony starts, or may be preset by automatic control of the display device 500. The size of the video telephony area may be adjusted real time by a user.

The display processor 530 may comprise a first receiving unit (not shown) which receives an output signal of an external device 10, and a second receiving unit (not shown) which receives an output signal of the control unit 520. The display processor 530 selects one of the first receiving unit (not shown), and the second receiving unit (not shown), and provides an output signal received through the selected receiving unit to the display 540. The external device 10 may be implemented as various devices such as a personal computer (PC), a television (TV), a digital versatile disc (DVD), or a personal video recorder (PVR).

Figure 6:
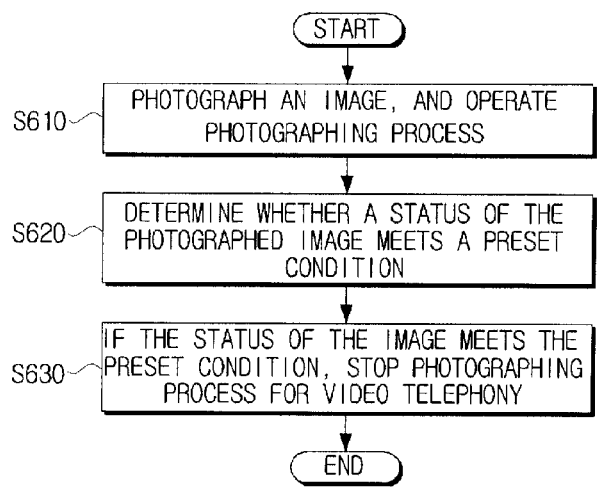
FIG. 6 is a flowchart illustrating a method for controlling a display device according to an exemplary embodiment of the present invention.

FIG. 6 is a flowchart illustrating a method for controlling a display device according to an exemplary embodiment of the present invention. According to a method for controlling a display device, if an image of a user is photographed, and photographing process is operated (S610), it determines whether a status of the photographed image meets a preset condition (S620).

If the status of the image meets the preset condition by determination of operation S620, the display device stops photographing image for video telephony (S630).

Also, according to the method for controlling a display device, the display device may selectively display one of result data of the video telephony according to the video telephony and data received from the external device.

Figure 7:
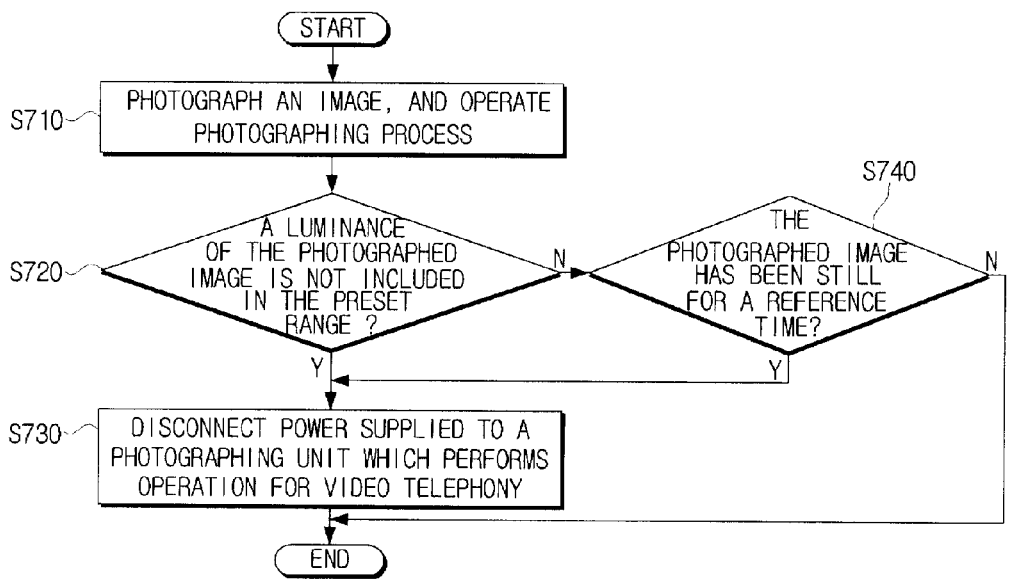
FIG. 7 is a flowchart illustrating a method for controlling display device of FIG. 6 according to an exemplary embodiment of the present invention.

FIG. 7 is a flowchart illustrating an exemplary embodiment of a method for controlling the display device of FIG. 6 according to an exemplary embodiment of the present invention. According to a method for controlling a display device, if an image of a user is photographed, and photographing process is operated (S710), it is determined whether a luminance of the photographed image is included in a valid range of the preset luminance (S720).

If the luminance of the photographed image is not included in the valid range of the present luminance by a result of operation S720 (S720-Y), that is, the luminance of the photographed image is equal to or greater than the preset first critical luminance, or equal to or less than the preset second critical luminance, photographing of a camera module is stopped by disconnecting power (S730).

If the luminance of the photographed image is included in the valid range of the present luminance by a result of operation S720 (S720-N), that is, the luminance of the photographed image is less than the preset first critical luminance, and more than the preset second critical luminance, it is determined whether the photographed image has been still for a reference time (S740).

If the photographed image has been still for the reference time by a result of operation S740 (S740-Y), photographing of a photographing unit is stopped by disconnecting power (S730).

In the exemplary embodiment of the present invention, a flowchart determining whether a luminance of the photographed image is included in a valid range of the present luminance is represented, but the order for determination may be modified as occasion demands.

Figure 8:
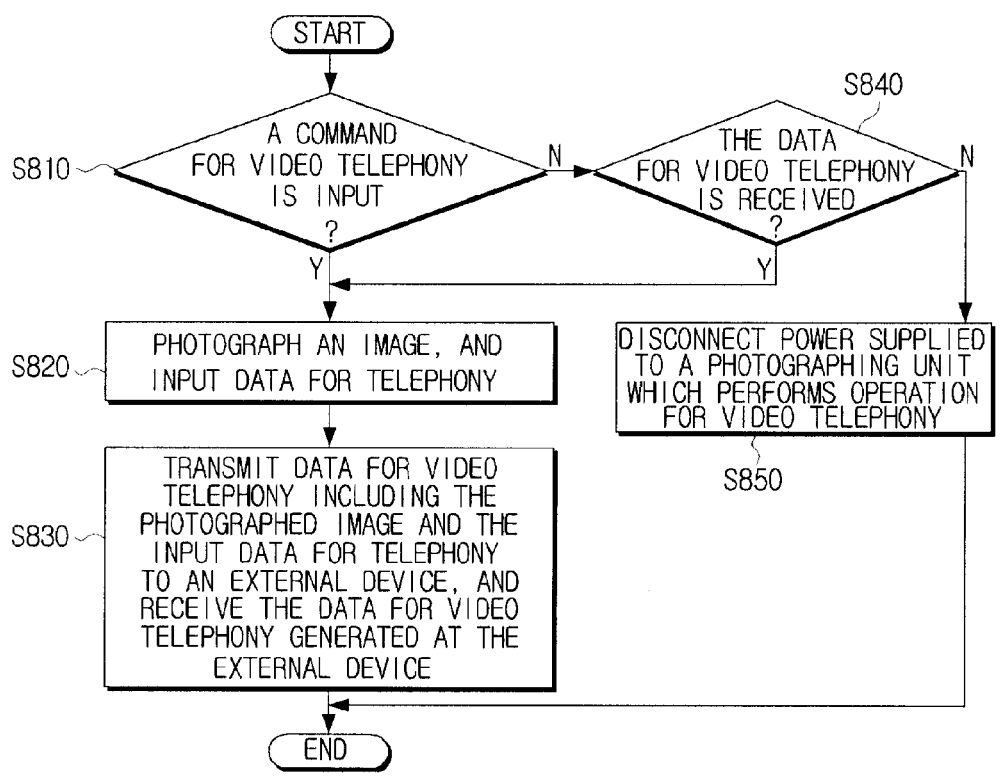
FIG. 8 is a flowchart illustrating a method for controlling the display device of FIG. 6 according to an exemplary embodiment of the present invention.

FIG. 8 is a flowchart illustrating in detail another exemplary embodiment of a method for controlling the display device of FIG. 6, according to an exemplary embodiment of the present invention. According to a method for controlling a display device illustrated in FIG. 8, it is determined whether a command for video telephony is input (S810).

If a command of video telephony is input by a result of operation S810 (S810-Y), power is supplied to a photographing unit which photographs an image (S820). An image is photographed, and data for telephony is input (S830). And then, video telephony data including the photographed image and the input data for telephony is transmitted to an external device, and the video telephony data generated at the external device is received (S840). The photographing unit may be implemented as a camera module which performs operations in relation to a photographing an image.

If the command for video telephony is not input by a result of operation S810 (S810-N), it is determined whether an image data is received from the external device (S850).

If the video telephony data is received by a result of operation S850 (S850-Y), power is supplied to a photographing unit which photographs an image (S820). An image is photographed, and data for a telephony is input (S830). And then, video telephony data including the photographed image and the input data for video telephony is transmitted to an external device, and the video telephony data generated at the external device is received (S840).

If the video telephony data is not received by a result of operation S550 (S850-N), power is disconnected to the photographing unit which photographs an image (S860).

Also, one of a result of the video telephony data according to the video telephony and receiving video telephony data from the external device may be selectively displayed.

In the exemplary embodiment of the present invention, a flowchart determining whether a command for video telephony is input and whether image data is received is represented, but the order of determination may be modified as occasion demands.

Accordingly, power supplied to the photographing unit is controlled such that power efficiency of a display device may be improved.

As described above, according to an exemplary embodiment of the present invention, power efficiency may be increased by whether to perform video telephony, and by controlling power supplied to a photographing unit by considering status of an image for video telephony. As a result, convenience for a user will be improved.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
   a video telephony unit which comprises a photographing unit, and performs video telephony using an image which is photographed through the photographing unit; and
   a control unit which controls at least one of an operation of the photographing unit and an operation of the video telephony unit if a status of the photographed image meets a preset condition,
   wherein the preset condition includes whether the photographed image has been still for a reference time, and further includes whether a luminance of the photographed image is equal to or greater than a preset first critical luminance, or equal to or less than a preset second critical luminance.

2. The display device of claim 1, wherein the video telephony unit comprises:
   a power supply unit which supplies power to the photographing unit;
   a data input unit which receives data for communication; and
   a data transceiver unit which is configured:
      to transmit video telephony data, wherein the video telephony data includes the photographed image and the data for communication, and
      to receive other video telephony data.

3. The display device of claim 2, wherein if the status of the photographed image meets the preset condition, the control unit controls the data transceiver unit such that the video telephony data is not transmitted.

4. The display device of claim 2, wherein if the status of the photographed image meets the preset condition, the control unit cuts off the power supply to the photographing unit.

5. The display device of claim 2, further comprising:
   an input unit which inputs a command for video telephony;
   wherein the video telephony unit is activated and performs operations for video telephony when the command for video telephony is input or the other video telephony data is received through the data transceiver unit.

6. The display device of claim 5, wherein the control unit cuts off the power supply to the photographing unit while the video telephony unit is in an inactivate state.

7. The display device of claim 2, further comprising:
   a display; and
   a display processor which selectively provides one of result data of the video telephony performed at the video telephony unit and the other video telephony data received from an external device to the display.

8. A method for controlling a display device which performs a video telephony comprising:
   (a) photographing an image, and performing video telephony using the photographed image;
   (b) determining whether a status of the photographed image meets a preset condition; and,
   (c) stopping the photographing if the preset condition is met,
   wherein the preset condition includes whether the photographed image has been still for a reference time, and further includes whether a luminance of the photographed image is equal to or greater than a preset first critical luminance, or equal to or less than a preset second critical luminance.

9. The method of claim 8, wherein the photographing the image comprises:
   supplying power to a photographing unit which photographs an image;
   photographing the image, and receiving data for communication; and
   transmitting the photographed image and the received data for communication to an external device as video telephony data, and receiving other video telephony data generated at the external device.

10. The method of claim 9, wherein the stopping the photographing causes the video telephony data not to be transmitted, if the status of the photographed image meets the preset condition.

11. The method of claim 9, wherein the stopping the photographing cuts off power supplied to the photographing unit, if the status of the photographed image meets the preset condition.

12. The method of claim 9, further comprising:
   receiving, by an input unit, a command for a video telephony;
   wherein the photographing the image includes performing an operation for a video telephony, when the command for a video telephony is input, or data for a video telephony is received.

13. The method of claim 12, wherein the stopping photographing cuts off the power supply to the photographing unit while a video telephony unit is in an inactivate state.

14. The method of claim 8, further comprising:
   selectively displaying one of a result of video telephony data according to the video telephony and data received from an external device.

* * * * *